United States Patent
Williams

(10) Patent No.: US 7,861,041 B2
(45) Date of Patent: Dec. 28, 2010

(54) SECOND CHANCE REPLACEMENT MECHANISM FOR A HIGHLY ASSOCIATIVE CACHE MEMORY OF A PROCESSOR

(75) Inventor: James D Williams, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 632 days.

(21) Appl. No.: 11/849,515

(22) Filed: Sep. 4, 2007

(65) Prior Publication Data

US 2009/0063776 A1 Mar. 5, 2009

(51) Int. Cl.
G06F 12/00 (2006.01)
(52) U.S. Cl. ............... 711/136; 711/128; 711/133; 711/144; 711/159; 711/160
(58) Field of Classification Search ........... 711/128, 711/133, 136, 144
See application file for complete search history.

(56) References Cited

U.S. PATENT DOCUMENTS

| | | | |
|---|---|---|---|
| 6,243,791 B1 * | 6/2001 | Vondran, Jr. | ............... 711/120 |
| 6,490,656 B1 | 12/2002 | Carlson | |
| 6,732,238 B1 | 5/2004 | Evans et al. | |
| 6,823,427 B1 | 11/2004 | Sander | |
| 2005/0223173 A1 * | 10/2005 | Yamazaki | ............... 711/128 |

OTHER PUBLICATIONS

International Search Report in application No. PCT/US2008/010368 mailed Dec. 4, 2008.

"Replacement Algorithm for a Fully Associative Cache;" IBM Technical Disclosure Bulletin, IBM Corp., New York, NY; vol. 41, No. 1, Jan. 1, 1998; pp. 123-124.

Wezenbeek, et al; "A Survey of Memory Management;" Microprocessing and Microprogramming, Elsevier Science Publishers, BV., Amsterdam, NL; vol. 36, No. 3, May 1, 1993, pp. 141-162.

Soundararajan, "Implementing a Better Cache Replacement Algorithm in Apache Derby Progress Report", Internet, Aug. 19, 2006, http://www.eecg.toronto.edu/~gokul/derby/derby-report-aug-19-2006.pdf.

* cited by examiner

*Primary Examiner*—Kevin L Ellis
*Assistant Examiner*—Mehdi Namazi
(74) *Attorney, Agent, or Firm*—Meyertons, Hood, Kivlin, Kowert & Goetzel, P.C.; Stephen J. Curran

(57) ABSTRACT

A cache memory system includes a cache memory and a block replacement controller. The cache memory may include a plurality of sets, each set including a plurality of block storage locations. The block replacement controller may maintain a separate count value corresponding to each set of the cache memory. The separate count value points to an eligible block storage location within the given set to store replacement data. The block replacement controller may maintain for each of at least some of the block storage locations, an associated recent access bit indicative of whether the corresponding block storage location was recently accessed. In addition, the block replacement controller may store the replacement data within the eligible block storage location pointed to by the separate count value depending upon whether a particular recent access bit indicates that the eligible block storage location was recently accessed.

20 Claims, 5 Drawing Sheets

SECOND CHANCE REPLACEMENT MECHANISM FOR A HIGHLY ASSOCIATIVE CACHE MEMORY OF A PROCESSOR

BACKGROUND OF THE INVENTION

1. Field of the Invention

This invention relates to microprocessor caches and, more particularly, to cache data replacement mechanisms.

2. Description of the Related Art

Since a computer system's main memory is typically designed for density rather than speed, microprocessor designers have added caches to their designs to reduce the microprocessor's need to directly access main memory. A cache is a small memory that is more quickly accessible than the main memory. Caches are typically constructed of fast memory cells such as static random access memories (SRAMs) which have faster access times and bandwidth than the memories used for the main system memory (typically dynamic random access memories (DRAMs) or synchronous dynamic random access memories (SDRAMs)).

Modern microprocessors typically include on-chip cache memory. In many cases, microprocessors include an on-chip hierarchical cache structure that may include a level one (L1), a level two (L2) and in some cases a level three (L3) cache memory. Typical cache hierarchies may employ a small, fast L1 cache that may be used to store the most frequently used cache lines. The L2 cache may be a larger and possibly slower cache for storing cache lines that are accessed frequently but don't fit in the L1. The L3 cache may be still larger than the L2 cache and may be used to store cache lines that are accessed frequently but do not fit in the L2 cache. Having a cache hierarchy as described above may improve processor performance by reducing the latencies associated with memory access by the processor core.

In a typical cache design, any given block of data may be placed only in one of some small number of physical locations, called a set (commonly referred to as a set associative cache). The maximum number of blocks per set is the associativity of the cache. Once a given set is full, each time new data must be brought into that set, an existing entry must be overwritten or replaced by the new data. Some type of algorithm must be used to determine which existing entry will be overwritten during a replacement. One type of replacement algorithm is the least recently used (LRU) algorithm. In the LRU algorithm, the time order of all the entries in each set is tracked, and as the name implies, the least recently used entry is replaced. This algorithm works well if the associativity is small. For higher associativity, keeping track of the LRU position becomes complex and requires significant amounts of storage for the ordering information.

SUMMARY

Various embodiments of a second chance replacement mechanism for a highly associative cache memory of a processor cache memory system are disclosed. In one embodiment, the cache memory system includes a cache memory coupled to block replacement controller. The cache memory may include a plurality of sets, each set including a plurality of block storage locations. The block replacement controller may be configured to maintain a separate count value corresponding to each set of the cache memory. The count value corresponding to a given set points to an eligible block storage location or group of block storage locations within the given set in which to store replacement data. The block replacement controller may maintain for each of at least some of the block storage locations, an associated recent access bit indicative of whether the corresponding block storage location was recently accessed. In addition, the block replacement controller may store the replacement data within one of the eligible block storage locations pointed to by the separate count value depending upon whether the particular recent access bit corresponding to that eligible block storage location indicates that the eligible block storage location was recently accessed.

In one specific implementation, the block replacement controller may store the replacement data within the eligible block storage location pointed to by the separate count value in response to the particular recent access bit corresponding to that storage location indicating that the storage location was not recently accessed.

In another specific implementation, the block replacement controller may inhibit storing the replacement data within the eligible block storage location pointed to by the separate count value in response to the particular recent access bit corresponding to the eligible block storage location indicating that the eligible block storage location was recently accessed.

Figure 1:
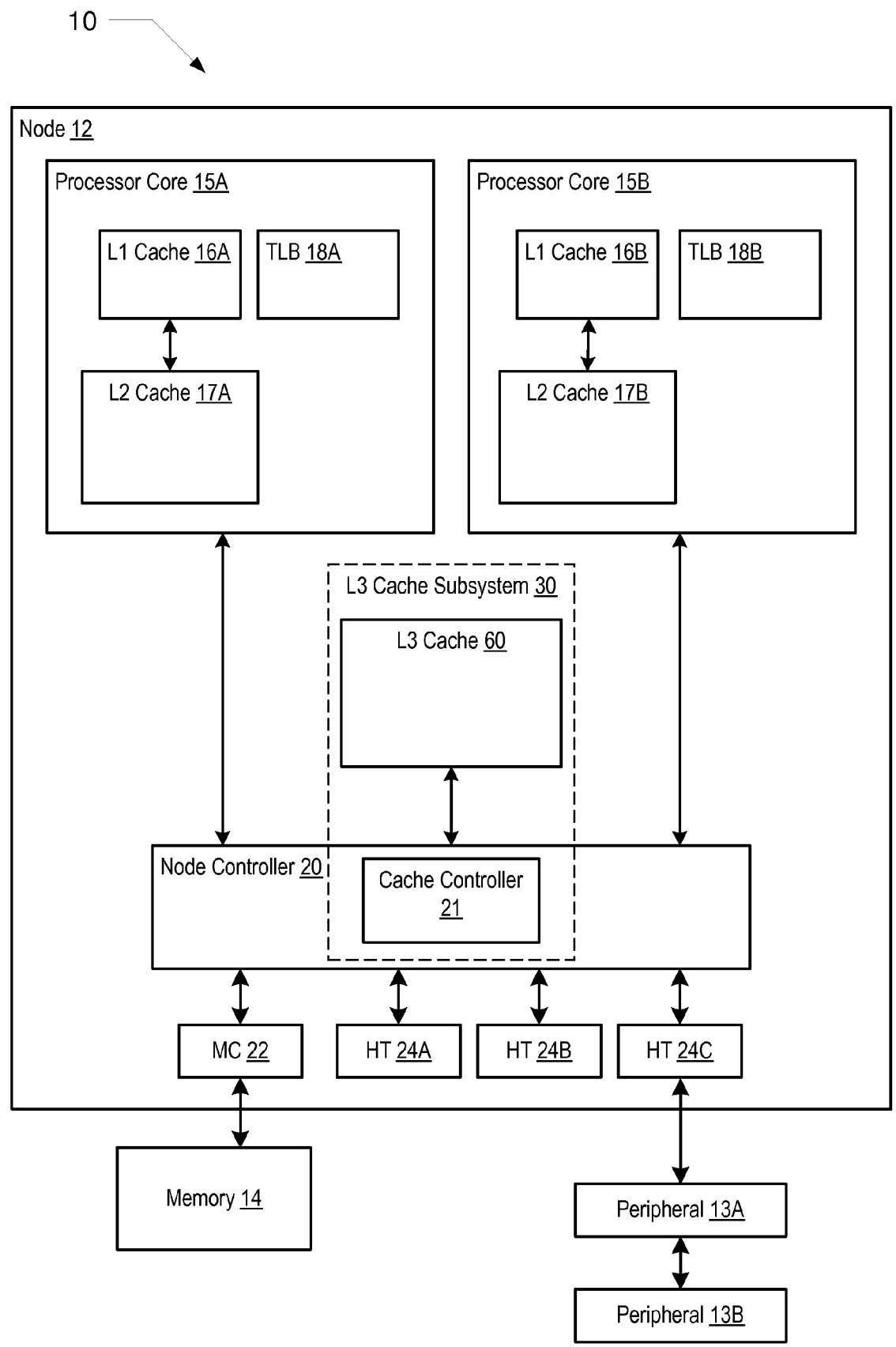
FIG. 1 is a block diagram of one embodiment of a computer system including a multi-core processing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a computer system 10 is shown. In the illustrated embodiment, the computer system 10 includes a processing node 12 coupled to memory 14 and to peripheral devices 13A-13B. The node 12 includes processor cores 15A-15B coupled to a node controller 20 which is further coupled to a memory controller 22, a plurality of HyperTransport™ (HT) interface circuits 24A-24C, and a shared level three (L3) cache memory 60. The HT circuit 24C is coupled to the peripheral device 16A, which is coupled to the peripheral device 16B in a daisy-chain configuration (using HT interfaces, in this embodiment). The remaining HT circuits 24A-B may be connected to other similar processing nodes (not shown) via other HT interfaces (not shown). The memory controller 22 is coupled to the memory 14. In one embodiment, node 12 may be a single integrated circuit chip comprising the circuitry shown therein in FIG. 1. That is, node 12 may be a chip multiprocessor (CMP). Any level of integration or discrete components may be used. It is noted that processing node 12 may include various other circuits that have been omitted for simplicity.

In various embodiments, node controller 20 may also include a variety of interconnection circuits (not shown) for interconnecting processor cores 15A and 15B to each other, to other nodes, and to memory. Node controller 20 may also include functionality for selecting and controlling various node properties such as the maximum and minimum operating frequencies for the node, and the maximum and minimum power supply voltages for the node, for example. The node controller 20 may generally be configured to route communications between the processor cores 15A-15B, the memory controller 22, and the HT circuits 24A-24C dependent upon the communication type, the address in the communication, etc. In one embodiment, the node controller 20 may include a system request queue (SRQ) (not shown) into which received communications are written by the node controller 20. The node controller 20 may schedule communications from the SRQ for routing to the destination or destinations among the processor cores 15A-15B, the HT circuits 24A-24C, and the memory controller 22.

Generally, the processor cores 15A-15B may use the interface(s) to the node controller 20 to communicate with other components of the computer system 10 (e.g. peripheral devices 13A-13B, other processor cores (not shown), the memory controller 22, etc.). The interface may be designed in any desired fashion. Cache coherent communication may be defined for the interface, in some embodiments. In one embodiment, communication on the interfaces between the node controller 20 and the processor cores 15A-15B may be in the form of packets similar to those used on the HT interfaces. In other embodiments, any desired communication may be used (e.g. transactions on a bus interface, packets of a different form, etc.). In other embodiments, the processor cores 15A-15B may share an interface to the node controller 20 (e.g. a shared bus interface). Generally, the communications from the processor cores 15A-15B may include requests such as read operations (to read a memory location or a register external to the processor core) and write operations (to write a memory location or external register), responses to probes (for cache coherent embodiments), interrupt acknowledgements, and system management messages, etc.

As described above, the memory 14 may include any suitable memory devices. For example, the memory 14 may comprise one or more random access memories (RAM) in the dynamic RAM (DRAM) family such as RAMBUS DRAMs (RDRAMs), synchronous DRAMs (SDRAMs), double data rate (DDR) SDRAM. Alternatively, memory 14 may be implemented using static RAM, etc. Memory 14 may be referred to as a computer readable medium in which program instructions may be stored. The memory controller 22 may comprise control circuitry for interfacing to the memories 14. Additionally, the memory controller 22 may include request queues for queuing memory requests, etc.

The HT circuits 24A-24C may comprise a variety of buffers and control circuitry for receiving packets from an HT link and for transmitting packets upon an HT link. The HT interface comprises unidirectional links for transmitting packets. Each HT circuit 24A-24C may be coupled to two such links (one for transmitting and one for receiving). A given HT interface may be operated in a cache coherent fashion (e.g. between processing nodes) or in a non-coherent fashion (e.g. to/from peripheral devices 16A-16B). In the illustrated embodiment, the HT circuits 24A-24B are not in use, and the HT circuit 24C is coupled via non-coherent links to the peripheral devices 13A-13B.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g., peripheral component interconnect (PCI), PCI express, etc.), etc.

The peripheral devices 13A-13B may be any type of peripheral devices. For example, the peripheral devices 13A-13B may include devices for communicating with another computer system to which the devices may be coupled (e.g. network interface cards, circuitry similar to a network interface card that is integrated onto a main circuit board of a computer system, or modems). Furthermore, the peripheral devices 13A-13B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 15A-15B may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15B may implement the x86 architecture. The processor cores 15A-15B may comprise any desired configurations, including superpipelined, superscalar, or combinations thereof. Other configurations may include scalar, pipelined, non-pipelined, etc. Various embodiments may employ out of order speculative execution or in order execution. The processor cores may include microcoding for one or more instructions or other functions, in combination with any of the above constructions. Various embodiments may implement a variety of other design features such as caches, translation lookaside buffers (TLBs), etc. Accordingly, in the illustrated embodiment, in addition to the L3 cache 60 that is shared by both processor cores, processor core 15A includes an L1 cache system 16A, an L2 cache system 17A, and a TLB 18A. Likewise, processor core 15B includes an L1 cache system 16B, an L2 cache system 17B, and a TLB 18B. The respective L1 and L2 caches may be representative of any L1 and L2 cache found in a microprocessor. In addition, the processing node 12 includes a shared L3 cache 60 that is part of an L3 cache subsystem 30. In the illustrated embodiment, the L3 cache subsystem 30 includes a cache controller unit 21 (which is shown as part of node controller 20) and the L3 cache 60. Cache controller 21 may be configured to control requests directed to the L3 cache 60.

As will be described in greater detail below, one or more of the caches and/or TLB structures may implement a replacement mechanism in which a replacement controller may maintain a recent access/used bit for each block storage location in a data storage array. In addition, the replacement controller may maintain a count value to successively point to each block storage location. As each eligible block storage location is looked at to determine whether to store replacement data, the recent access/used (RU) bit may indicate whether the corresponding block storage location was recently accessed. Thus, the block replacement controller may store the replacement data in the block storage location pointed to by the count value based upon whether the RU bit indicates the location was recently accessed.

It is also noted that, while the computer system 10 illustrated in FIG. 1 includes one processing node 12, other embodiments may implement any number of processing nodes. Similarly, a processing node such as node 12 may include any number of processor cores, in various embodiments. Various embodiments of the computer system 10 may also include different numbers of HT interfaces per node 12, and differing numbers of peripheral devices 16 coupled to the node, etc.

Figure 2:
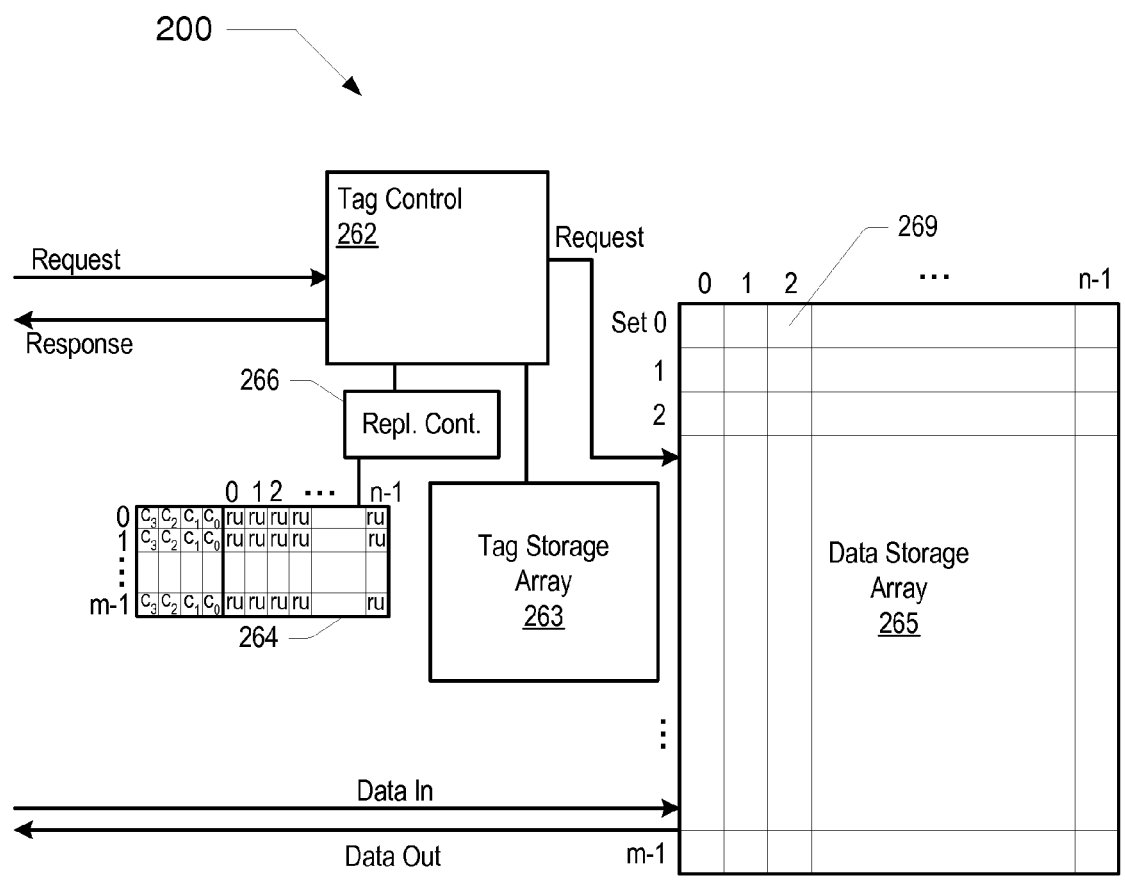
FIG. 2 is a block diagram illustrating more detailed aspects of an embodiment of a cache memory of FIG. 1.

Turning to FIG. 2, a block diagram illustrating more detailed aspects of an embodiment of a cache memory system of FIG. 1 is shown. The cache memory system 200 includes a tag control 262, a block replacement controller 266, a least recently used (LRU) storage array 264, a tag storage array 263, and a data storage array 265, which is sometimes referred to as a cache memory.

The tag storage array 263 may be configured to store within each of a plurality of locations a number of address bits (i.e., tag) of a cache line of data stored within the data storage array 265. In one embodiment, the tag control 262 may be configured to search the tag storage array 263 to determine whether a requested cache line is present in the data storage array 265. For example, tag control 262 may determine whether one or more address bits associated with a read request matches any address tag stored within the tag storage array 263. If the tag control 262 matches on a requested address, the tag control 262 may return a hit indication to the cache controller 21, and a miss indication if there is no match found in the tag array 263.

In the illustrated embodiment, the data storage array 265 includes a plurality of block storage locations (e.g., 269). As shown, data storage array 265 has m rows numbered 0 through m−1, and n columns numbered 0 through n−1. In this embodiment, the data storage array 265 implements a set associative cache memory that includes n ways of associativity. The ways are represented by the columns, and the sets are represented by the rows. For example, if the cache memory is a 16 way set associative cache, then n would be 16 and each set would include 16 block storage locations that may provide storage for a block of data. Typically, a block of data may be a cache line. The number of sets may be dependent upon the size of the cache memory.

The LRU storage array 264 includes a plurality of storage locations. In the illustrated embodiment, the LRU storage array 264 includes rows and columns that correspond to the rows and columns of the data storage array 265, where the sets are represented by the rows. In the storage locations labeled "ru" in the LRU storage array 264, the block replacement controller 266 may maintain a recently accessed/used (RU) bit for each block storage location in the data storage array 265. Each RU bit indicates whether the corresponding location in the data storage array was recently accessed. As used herein, accessed/used refers to an operation in which a block storage location within the data storage array is read or written or otherwise accessed as a result of a cache request to the data in that block storage location.

In addition to RU bits, the block replacement controller 266 may maintain a count value within each row of the LRU storage array 264. For example, as shown in FIG. 2, the reference numbers C0, C1, C2, and C3 in each row represent a four-bit count value. The count value represents a pointer to a respective block storage location within the corresponding row of data storage array 265, which may implement a 16-way set associative cache. Hence the count value shown is a four-bit value. If the number of ways were different, then the count value may have a different number of bits. In the illustrated embodiment, the count value corresponding to a given set also represents a pointer to the associated RU bit in the LRU storage array 264.

It is noted that in one embodiment, an RU bit may indicate that a block storage location was not recently accessed when it is clear. That is to say, when the RU bit is at a logic value of zero. Likewise, an RU bit may indicate that a block storage location was recently accessed when it is set. That is to say, when the RU bit is at a logic value of one. However, it is equally contemplated that the logic values may be reversed such that an RU bit may indicate that a block storage location was not recently accessed when it is set, or at a logic value of one, and an RU bit may indicate that a block storage location was recently accessed when it is clear, or at a logic value of zero.

Thus as described in greater detail below in conjunction with the description of FIG. 3, block replacement controller 266 may be configured to store replacement data within data storage array 265 if the count value points to a block storage location having a corresponding RU bit that indicates the block storage location was not recently accessed. In addition, recently accessed as used in this embodiment, refers to "accessed/used" since the last time the count value pointed to this block storage location.

It is noted that the replacement mechanism may be used in any type of cache that uses a replacement algorithm. For example, the cache memory system 200 described above may be representative of an L1 cache, an L2 cache, or an L3 cache. Further, there are other types of cache memories within a processor's micro-architecture as well. For example, many processors use a storage known as a translation look-aside buffer (TLB) to store virtual or linear address to physical address translations. These types of storages may also use a replacement algorithm in much the same way as a typical cache. As such, it is contemplated that the replacement mechanism described above may also be used on these types of caches.

Figure 3:
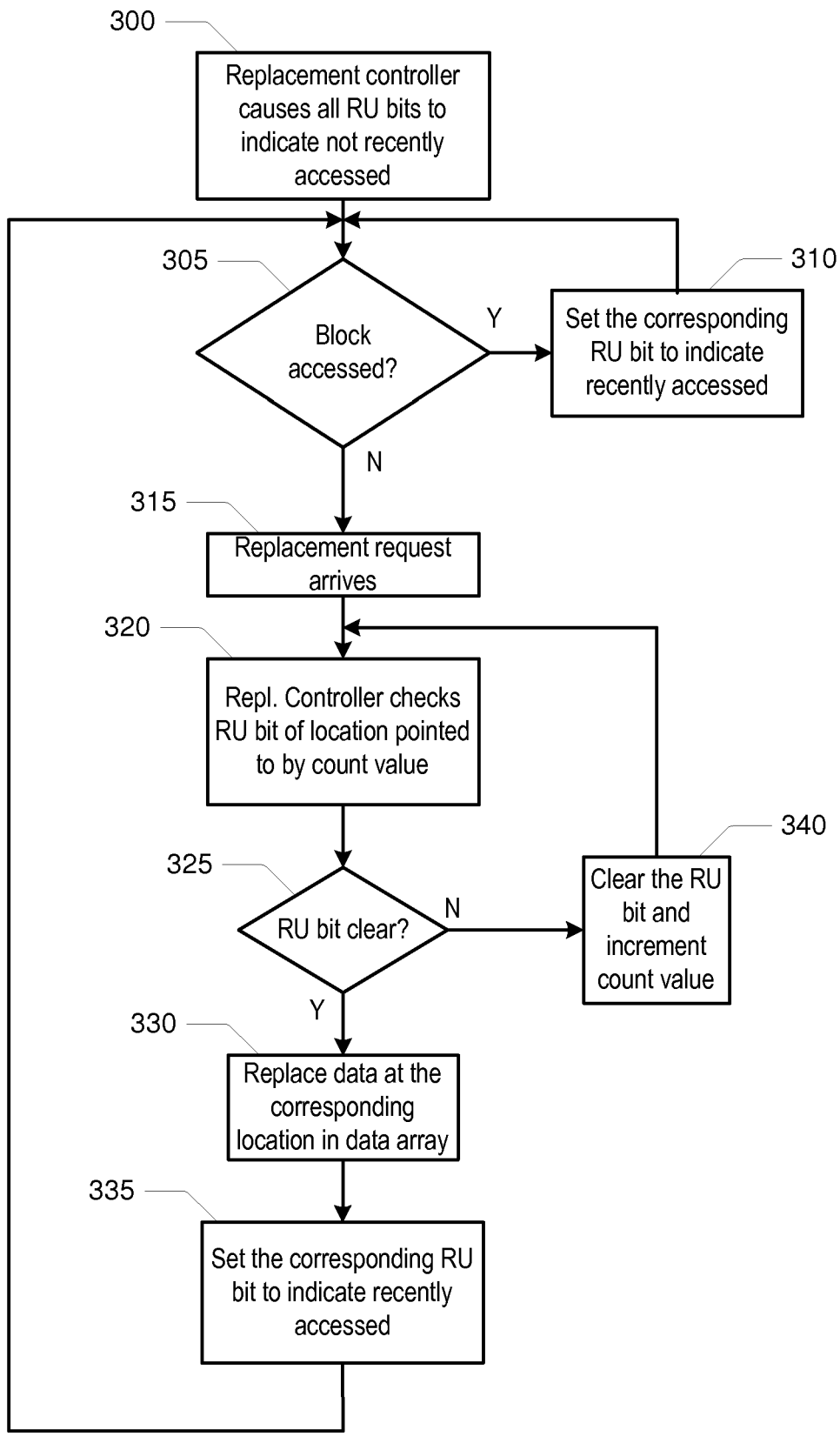
FIG. 3 is a flow diagram describing the operation of one embodiment of the cache memory of FIG. 2.

FIG. 3 is a flow diagram that describes the operation of the embodiment of the cache memory system 200 of FIG. 2. Referring collectively to FIG. 2 and FIG. 3, in block 300, in one embodiment, the block replacement controller 266 causes all RU bits to indicate not recently accessed. This may be done coming out of reset, for example. In response to a cache access request such as a read request to a given block storage location, for example (block 305), block replacement controller 266 sets the RU bit that corresponds to the accessed block storage location (block 310). This operation may occur each time a block storage location is accessed.

When the data storage array 265 is full of valid data, any additional data fills will require data to be replaced. Thus, in response to a replacement request (block 315), block replacement controller 266 checks the RU bit corresponding to the block storage location pointed to by the count value in the set indicated by the address of the request (block 320). If the RU bit is clear (in this example), indicating the location was not recently accessed (block 325), the block replacement controller 266 replaces the data in the block storage location pointed to by the count value in the set indicated by the address of the request (block 330), and sets the corresponding RU bit (indicating recently accessed). Operation then proceeds as described above in block 305.

Referring back to block 325, if the RU bit is set, indicating the location was recently accessed, the block replacement controller 266 clears the RU bit currently pointed to by the count value (indicating not recently accessed), and increments the count value to point to the next eligible block storage location in the set (block 340). The block replacement controller 266 may then check the next RU bit to see if it is clear or set. As above, if the RU bit is set, indicating the next location was recently accessed, the block replacement controller 266 clears the RU bit currently pointed to by the count value (indicating not recently accessed), and increments the count value to point to the next block storage location in the set. This operation may continue until the block replacement controller finds an RU bit that is clear, in which case operation would proceed as described above in block 330. Accordingly, although unlikely, it is possible that all the RU bits may be cleared in one replacement cycle.

The embodiments describe above provide a second chance before being replaced, for any block that may be accessed between successive passes of the counter.

Figure 4:
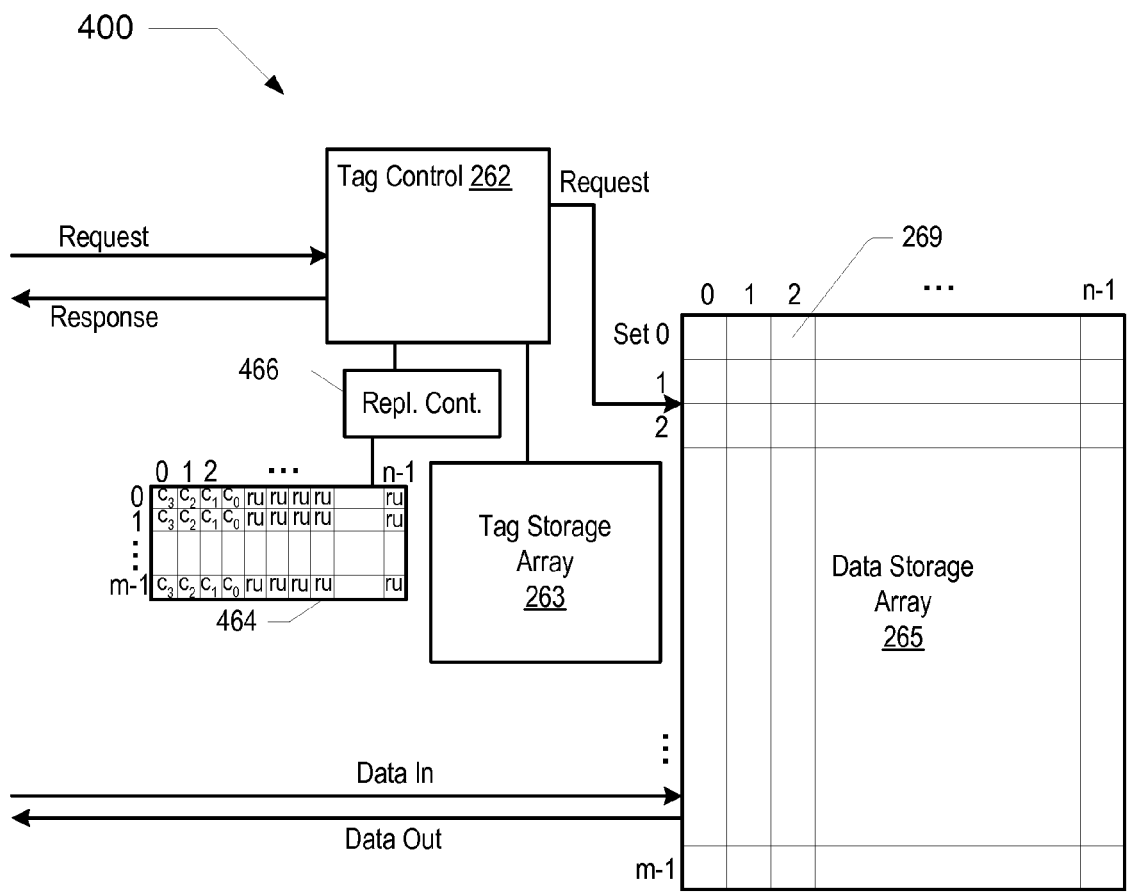
FIG. 4 is a block diagram illustrating more detailed aspects of another embodiment of a cache memory of FIG. 1.

Turning to FIG. 4, a block diagram illustrating more detailed aspects of another embodiment of a cache memory system 400 is shown. Cache memory system 400 is similar to cache memory 200 of FIG. 2, however there are some operational differences. More particularly, depending on the implementation, it may not be necessary to maintain an RU bit for each block storage location in the data storage array 265. As described below, the total recent use information, including both the counter and RU bits, is kept to one bit per block storage location.

In the embodiment shown in FIG. 4, the cache memory system 400 includes a tag control 262, a block replacement controller 466, a least recently used (LRU) storage array 464, a tag storage array 263, and a data storage array 265, which is sometimes referred to as a cache memory. As shown, the data storage array 265 of FIG. 4 includes a plurality of block storage locations (e.g., 269), and implements a set associative cache memory that includes a number of ways of associativity. Accordingly, the LRU storage array 464 also includes a plurality of storage locations. In one embodiment, the block replacement controller 466 may maintain a count value for each set in the data storage array 265. As such, the LRU storage array 464 also includes rows and columns that correspond to the rows and columns of the data storage array 265, where the sets are represented by the rows. In one embodiment, the block replacement controller 266 may store each count value within a row the LRU storage array 464. For example, as shown in FIG. 4, the reference numbers C0, C1, C2, and C3 in each row represent a four-bit count value. The count value represents a pointer to a respective block storage location within the data storage array 265.

However in contrast to the embodiment shown in FIG. 2, the block replacement controller 466 of FIG. 4 may maintain recently accessed/used (RU) bits for only a portion of the block storage locations in the data storage array 265. In the illustrated embodiment, to reduce the storage required for LRU information within LRU array 464, the count value is stored among the RU bits. Thus, the number of RU bits may be $n-\log_2 n$, where n is the number of ways of associativity. For example, in a 16-way cache, there would be 12 RU bits and a four-bit count value. In this case, the RU bits that the pointer has most recently passed over may be treated as being logic zeros, so no storage is needed for these bits. In addition, it may be useful to store the RU bits according to their positions relative to the counter rather than according to absolute way numbers. For example, the block replacement controller 466 may store the count value within LRU array 464 such that the first RU bit storage location after the count value storage corresponds to whatever block storage location is being pointed to by the count value. Thus, if the count value is six, the RU bit stored in column 4, for example, would correspond to block storage location for way number six, and not way number four as it did in the embodiment shown in FIG. 2.

As described above in conjunction with the description of FIG. 4, the RU bits within a particular row of LRU storage array 464 are shifted left by one bit position every time the count value is incremented. Since any or all of the RU bits could potentially be one at the time of a replacement request, it might seem that a shifter is needed with as many ways as the number of RU bits per row. However, the required shifter size may be reduced by a factor of some number 'k', by waiting for the first k RU bits to be set before incrementing the counter, and incrementing only in multiples of k. In this case, the way to be used for any given replacement will not necessarily be the way pointed to by the count value, but could be any of the ways from the count value to count value+k−1, whose RU bit indicates not recently accessed/used. For example, in the illustrated embodiment, the count value may be incremented by multiples of four (k=4). In this case, the 2 least significant bits of the count value will always be logic zero, so no storage is needed for them. The storage space saved in this way may be used to store additional RU bits. Thus, in this example, the 16 bits of LRU storage per set will be apportioned to a two-bit count value plus 14 RU bits.

In one embodiment, each RU bit indicates whether a corresponding block storage location in the data storage array 265 was recently accessed. As used herein, accessed/used refers to an operation in which a block storage location within the data storage array is read or written or otherwise accessed as a result of a cache request to the data in that block storage location.

It is noted that in one embodiment, an RU bit may indicate that a block storage location was not recently accessed when it is clear. That is to say, when the RU bit is at a logic value of zero. Likewise, an RU bit may indicate that a block storage location was recently accessed when it is set. That is to say, when the RU bit is at a logic value of one. However, it is equally contemplated that the logic values may be reversed such that an RU bit may indicate that a block storage location was not recently accessed when it is set, or at a logic value of one, and an RU bit may indicate that a block storage location was recently accessed when it is clear, or at a logic value of zero.

Figure 5:
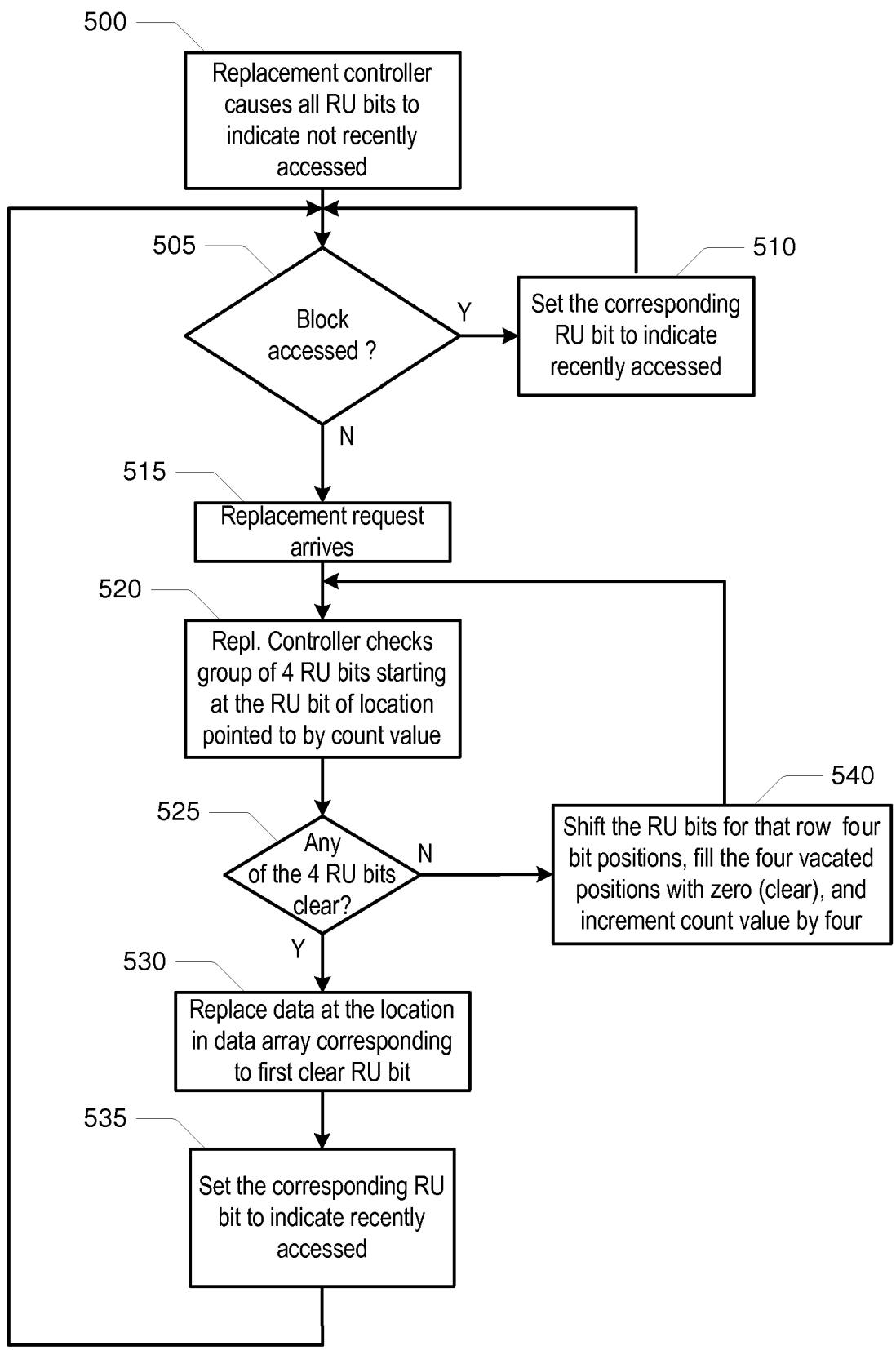
FIG. 5 is a flow diagram describing the operation of one embodiment of the cache memory of FIG. 4.

FIG. 5 is a flow diagram that describes operational details of the embodiment shown in FIG. 4, as modified in the preceding paragraphs. Referring collectively to FIG. 4 and FIG. 5, in block 500 of FIG. 5, the block replacement controller 466 causes all RU bits to indicate not recently accessed. This may be done coming out of reset, for example. In response to a cache access request such as a read request to a given block storage location, for example (block 505), block replacement controller 466 sets the RU bit that corresponds to the accessed block storage location, if such a bit exists at the time of the request (block 510). This operation may occur each time a block storage location is accessed.

When the data storage array 265 is full of valid data, any additional data fills will require data to be replaced. Thus, in response to a replacement request (block 515), block replacement controller 466 checks the RU bit corresponding to the block storage location pointed to by the count value in the set indicated by the address of the request (block 520), as well as the next 3 RU bits for that set. If any of these four RU bits is clear, indicating that the location was not recently accessed (block 525), the block replacement controller 466 replaces the data in the block storage location corresponding to the first clear RU bit in this group of four RU bits (block 530), and sets this bit to indicate recently accessed. Operation proceeds as described above in block 505.

Referring back to block 525, if all four of the examined RU bits are set, indicating the locations were recently accessed, the block replacement controller 466 shifts all of the RU bits for that row by four bit-positions to the left, with zero-fill at the right-hand end (indicating not recently accessed), and increments the count value by four to point to the next eligible group of four block storage locations in the set (block 540). The block replacement controller 466 may then check the next group of four RU bits to see if any of them are clear. As above, if all four RU bits are set, indicating the that these locations were recently accessed, the block replacement controller 466 shifts all of the RU bits for that row by four bit-positions to the left, with zero-fill (indicating not recently accessed), and increments the count value by four to point to the next eligible group of four block storage locations in the set. This operation may continue until the block replacement controller finds an RU bit that is clear, in which case operation would proceed as described above in block 530. Accordingly, although unlikely, it is possible that most of the RU bits may be cleared in one replacement cycle.

It is noted that in an alternative embodiment, the block replacement controller 466 may be configured to shift/clear the four RU bits for a given row whenever the first four bits are found to be set, without waiting for the next replacement request. In this case, when a replacement request arrives, it is already guaranteed that at least one RU bit is clear in the first group of four.

It is also noted that although not shown, in some embodiments, there may be valid bits/information that may be stored either with the tag array 263 or in a separate storage array. As such, a block storage location that has invalid data may always be used to store replacement data before a location that has valid data. Thus, when a cache request is received, the valid information may be checked prior to the RU information when determining in which location to store replacement data.

It is further noted that although the embodiments described above include a node having multiple processor cores, it is contemplated that the functionality associated with cache system 200 and 400 may be used in any type of processor, including single core processors. In addition, although the embodiments have been described in terms of hardware, it is contemplated that the embodiments may be implemented in hardware, software or a combination of hardware and software. In embodiments implemented in software, the program instructions may be stored within, for example, memory 14 of FIG. 1 and executed by processor core 15A or 15B as desired. However, it is contemplated that the program instructions may be stored on any type of storage medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cache memory system comprising:
   a cache memory including a plurality of sets, each set including a plurality of block storage locations; and
   a block replacement controller coupled to the cache memory and configured to maintain a separate count value corresponding to each set of the cache memory, wherein the separate count value corresponding to a given set points to an eligible block storage location within the given set to store replacement data;
   wherein the block replacement controller is further configured to maintain for each of at least some of the block storage locations, an associated recent access bit indicative of whether the corresponding block storage location was recently accessed since a last time the separate count value pointed to the corresponding block storage location, wherein the recent access bit is separate from the separate count value for a given set; and
   wherein the block replacement controller is further configured to store the replacement data within the eligible block storage location pointed to by the separate count value depending upon whether a particular one of the recent access bits corresponding to the eligible block storage location indicates that the eligible block storage location was recently accessed.

2. The cache memory system as recited in claim 1, wherein the block replacement controller is configured to store the replacement data within the eligible block storage location pointed to by the separate count value in response to the particular one of the recent access bits corresponding to the eligible block storage location indicating that the eligible block storage location was not recently accessed.

3. The cache memory system as recited in claim 1, wherein the block replacement controller is further configured to cause the particular one of the recent access bits corresponding to the eligible block storage location to indicate the eligible block storage location was recently accessed in response to a cache access request accessing the eligible block storage location.

4. The cache memory system as recited in claim 1, wherein the block replacement controller is further configured to inhibit storing the replacement data within the eligible block storage location pointed to by the separate count value in response to the particular one of the recent access bits corresponding to the eligible block storage location indicating that the eligible block storage location was recently accessed.

5. The cache memory system as recited in claim 1, wherein the block replacement controller is configured to cause a given recent access bit to indicate an associated eligible block storage location was not recently accessed in response to a corresponding separate count value pointing to the corresponding eligible block storage location and the given recent access bit indicates the corresponding eligible block storage location was recently accessed.

6. The cache memory system as recited in claim 5, wherein the block replacement controller is configured to increment the separate count value in response to the particular one of the recent access bits corresponding to the eligible block storage location pointed to by the separate count value indicating the eligible block storage location was recently accessed.

7. The cache memory system as recited in claim 1, wherein a number of recent access bits directly corresponds to a number of sets multiplied by a number of ways of associativity of the cache memory.

8. The cache memory system as recited in claim 1, wherein a number of recent access bits directly corresponds to a number of sets multiplied by $n \cdot \log_2 n$, where n is equal to a number of ways of associativity of the cache memory.

9. A method comprising:
   providing a cache memory including a plurality of sets, each set including a plurality of block storage locations; and
   maintaining a separate count value corresponding to each set of the cache memory, wherein the separate count value corresponding to a given set points to an eligible block storage location within the given set to store replacement data;

maintaining for each of at least some of the block storage locations, an associated recent access bit indicative of whether the corresponding block storage location was recently accessed since a last time the separate count value pointed to the corresponding block storage location, wherein the recent access bit is separate from the separate count value for a given set; and storing the replacement data within the eligible block storage location pointed to by the separate count value depending upon whether a particular one of the recent access bits corresponding to the eligible block storage location indicates that the eligible block storage location was recently accessed.

10. The method as recited in claim 9, further comprising storing the replacement data within the eligible block storage location pointed to by the separate count value in response to the particular one of the recent access bits corresponding to the eligible block storage location indicating that the eligible block storage location was not recently accessed.

11. The method as recited in claim 10, further comprising causing the particular one of the recent access bits corresponding to the eligible block storage location to indicate the eligible block storage location was recently accessed in response to a cache access request accessing the eligible block storage location.

12. The method as recited in claim 10, further comprising inhibiting storing the replacement data within the eligible block storage location pointed to by the separate count value in response to the particular one of the recent access bits corresponding to the eligible block storage location indicating that the eligible block storage location was recently accessed.

13. The method as recited in claim 11, further comprising causing a given recent access bit to indicate an associated eligible block storage location was not recently accessed in response to a corresponding separate count value pointing to the corresponding eligible block storage location and the given recent access bit indicates the corresponding eligible block storage location was recently accessed.

14. The method as recited in claim 11, further comprising incrementing the separate count value in response to the particular one of the recent access bits corresponding to the eligible block storage location pointed to by the separate count value indicating the eligible block storage location was recently accessed.

15. The method as recited in claim 9, wherein a number of recent access bits directly corresponds to a number of sets multiplied by a number of ways of associativity of the cache memory.

16. The method as recited in claim 9, wherein a number of recent access bits directly corresponds to a number of sets multiplied by $n-\log_2 n$, where n is equal to a number of ways of associativity of the cache memory.

17. A computer readable medium including program instructions executable by a processor to:

maintain a separate count value corresponding to each set of a plurality of sets of a cache memory, wherein each set includes a plurality of block storage locations, wherein the separate count value corresponding to a given set points to an eligible block storage location within the given set to store replacement data;

maintain for each of at least some of the block storage locations, an associated recent access bit indicative of whether the corresponding block storage location was recently accessed since a last time the separate count value pointed to the corresponding block storage location, wherein the recent access bit is separate from the separate count value for a given set; and store the replacement data within the eligible block storage location pointed to by the separate count value depending upon whether a particular one of the recent access bits corresponding to the eligible block storage location indicates that the eligible block storage location was recently accessed.

18. The computer readable medium as recited in claim 17, wherein the program instructions further comprising instructions executable by a processor to store the replacement data within the eligible block storage location pointed to by the separate count value in response to the particular one of the recent access bits corresponding to the eligible block storage location indicating that the eligible block storage location was not recently accessed.

19. The computer readable medium as recited in claim 18, wherein the program instructions further comprising instructions executable by a processor to cause the particular one of the recent access bits corresponding to the eligible block storage location to indicate the eligible block storage location was recently accessed in response to a cache access request accessing the eligible block storage location.

20. The computer readable medium as recited in claim 18, wherein the program instructions further comprising instructions executable by a processor to inhibit storing the replacement data within the eligible block storage location pointed to by the separate count value in response to the particular one of the recent access bits corresponding to the eligible block storage location indicating that the eligible block storage location was recently accessed.

* * * * *